(12) United States Patent
Saunders

(10) Patent No.: US 9,468,202 B2
(45) Date of Patent: Oct. 18, 2016

(54) HOLDER FOR RIGGING ATTACHMENT FOR USE ON A FISHING ROD OR POLE

(71) Applicant: Mick B. Saunders, Plainwell, MI (US)

(72) Inventor: Mick B. Saunders, Plainwell, MI (US)

(*) Notice: Subject to any disclaimer, the term of this patent is extended or adjusted under 35 U.S.C. 154(b) by 164 days.

(21) Appl. No.: 14/547,675

(22) Filed: Nov. 19, 2014

(65) Prior Publication Data

US 2016/0135442 A1   May 19, 2016

(51) Int. Cl.
  *A01K 87/00* (2006.01)
  *A01K 97/06* (2006.01)
  *A01K 99/00* (2006.01)

(52) U.S. Cl.
  CPC .............. *A01K 97/06* (2013.01); *A01K 99/00* (2013.01)

(58) Field of Classification Search
  None
  See application file for complete search history.

(56) References Cited

U.S. PATENT DOCUMENTS

| | | | | |
|---|---|---|---|---|
| 2,659,544 | A | | 11/1953 | Freeman |
| 3,281,981 | A | * | 11/1966 | Dykhouse ............ A01K 97/06 24/21 |
| D217,663 | S | * | 5/1970 | Chamberlain ................. 43/25.2 |
| 5,172,509 | A | * | 12/1992 | Motovik ................ A01K 87/00 43/25 |
| 5,448,851 | A | * | 9/1995 | Nyberg ................. A01K 87/00 43/25.2 |
| 7,152,359 | B1 | * | 12/2006 | Adams ................... A01K 97/06 43/25.2 |
| 7,191,559 | B1 | * | 3/2007 | Laceky .................. A01K 97/06 43/21.2 |
| 8,407,928 | B2 | * | 4/2013 | Brown ................... A01K 97/06 43/25.2 |
| 8,813,416 | B2 | * | 8/2014 | Hudson .................. A01K 97/06 43/25.2 |
| 2002/0116861 | A1 | * | 8/2002 | Stockdale ............. A01K 87/00 43/25.2 |
| 2005/0229472 | A1 | * | 10/2005 | Jost ........................ A01K 97/06 43/25.2 |
| 2010/0083558 | A1 | * | 4/2010 | Brown ................... A01K 97/06 43/25.2 |
| 2013/0185988 | A1 | * | 7/2013 | McKenzie ............ A01K 97/06 43/25.2 |

* cited by examiner

*Primary Examiner* — Christopher P Ellis
(74) *Attorney, Agent, or Firm* — Flynn, Thiel, Boutell & Tanis, P.C.

(57) ABSTRACT

A holder attachment for rigging used in fishing. The holder includes an elongate unitary body made of an elastic material and has four laterally facing surfaces and two end surfaces. The two end surfaces each have an outwardly opening cavity therein that also opens outwardly at laterally opposite sides. One of the side surfaces has a pair of longitudinally extending and outwardly protruding ribs defining a slot therebetween that opens axially at the oppositely facing end surfaces. The ribs each have a longitudinally extending cavity to define together an elongate channel. The ribs are configured to be forcibly elastically spread apart to facilitate the reception of a fishing rod or pole therebetween and into the channel, a release of the force spreading the ribs apart enabling the elasticity of the material to return to its original shape to hold the rod in the channel.

9 Claims, 8 Drawing Sheets

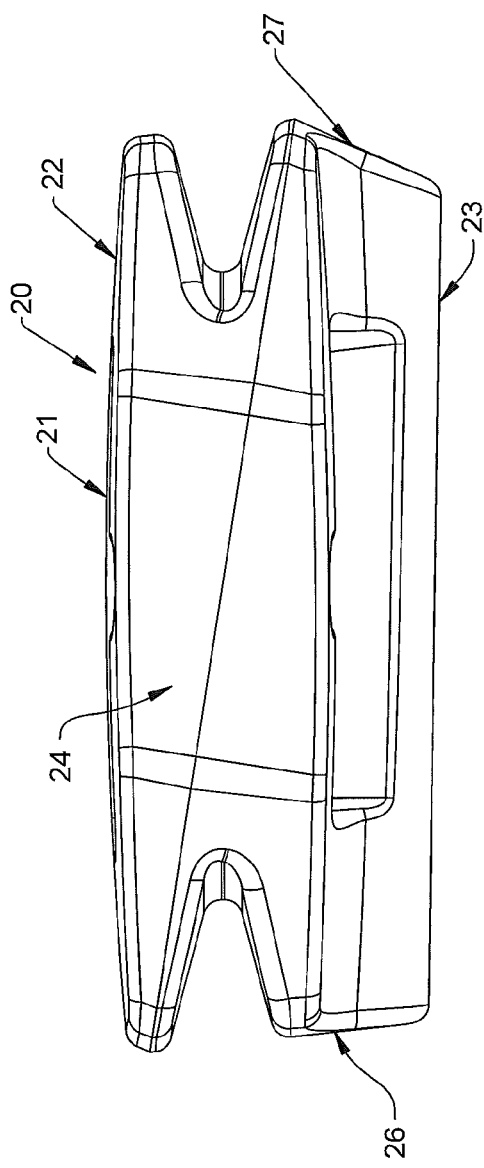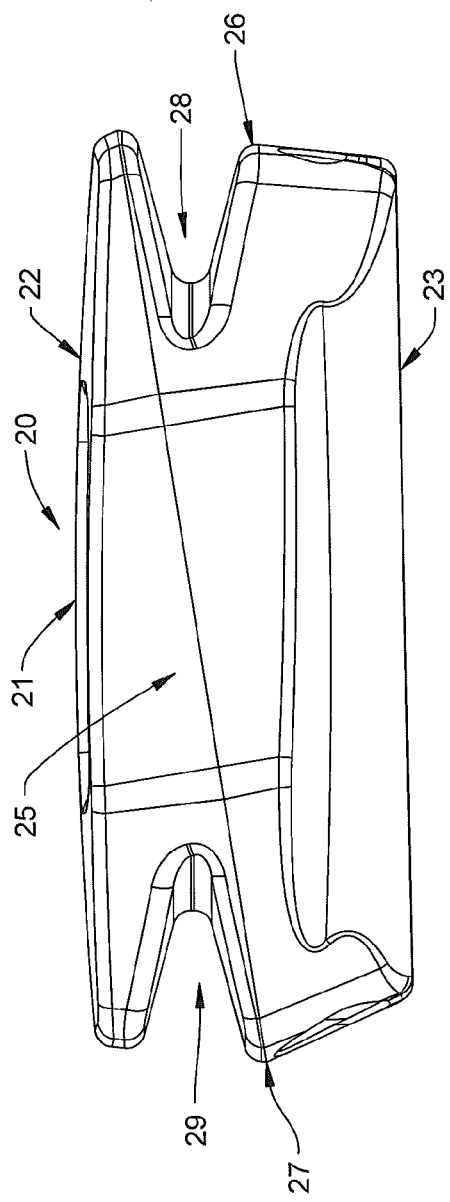

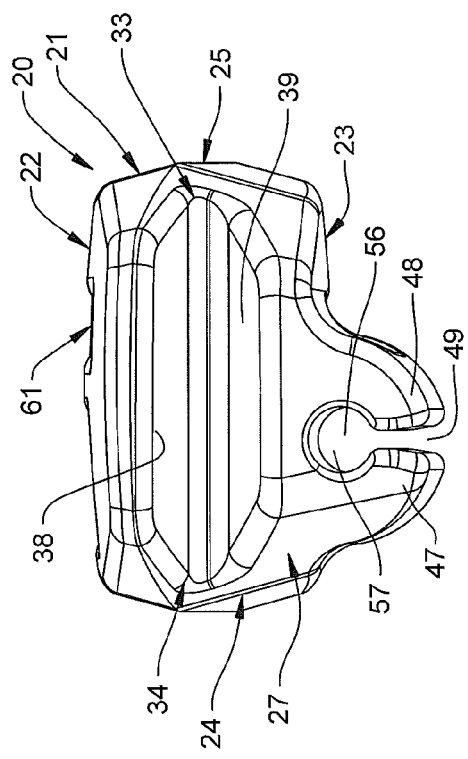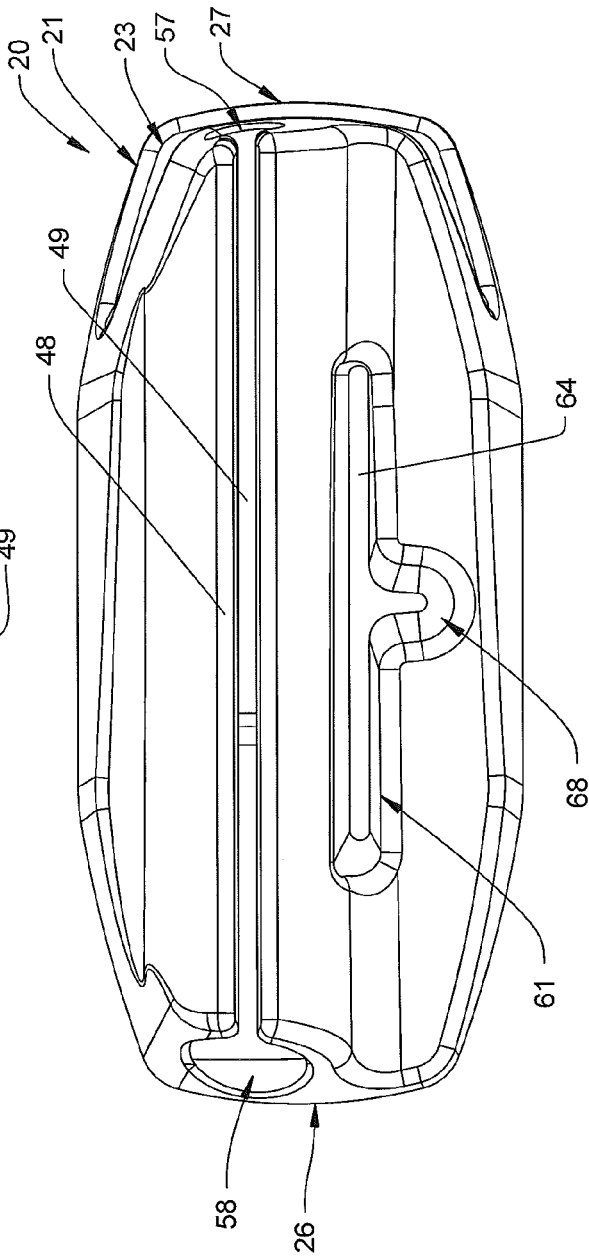

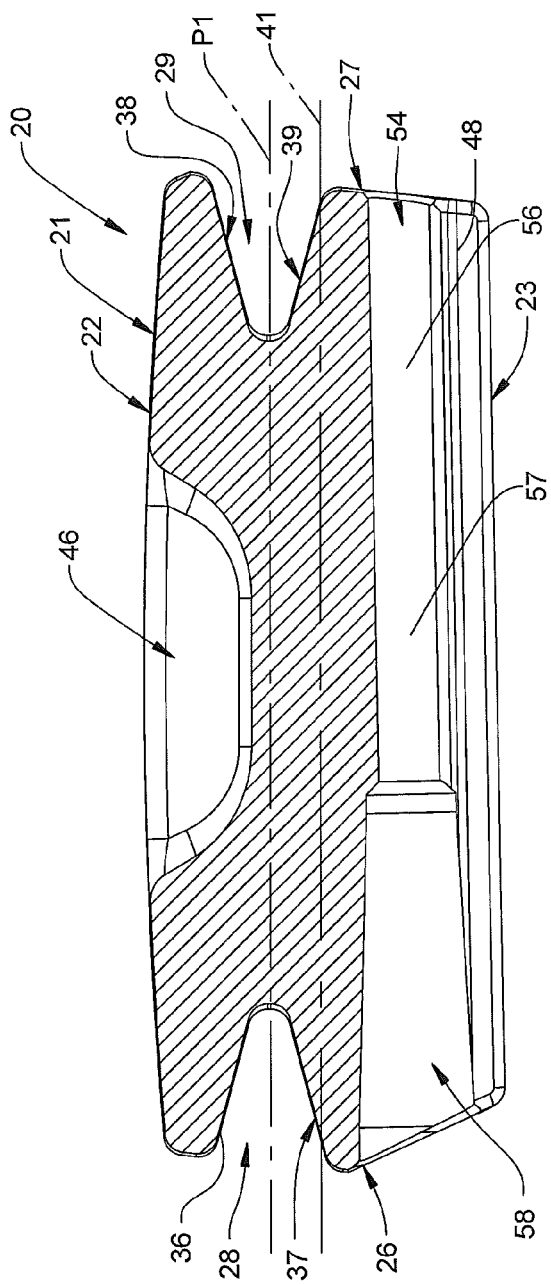
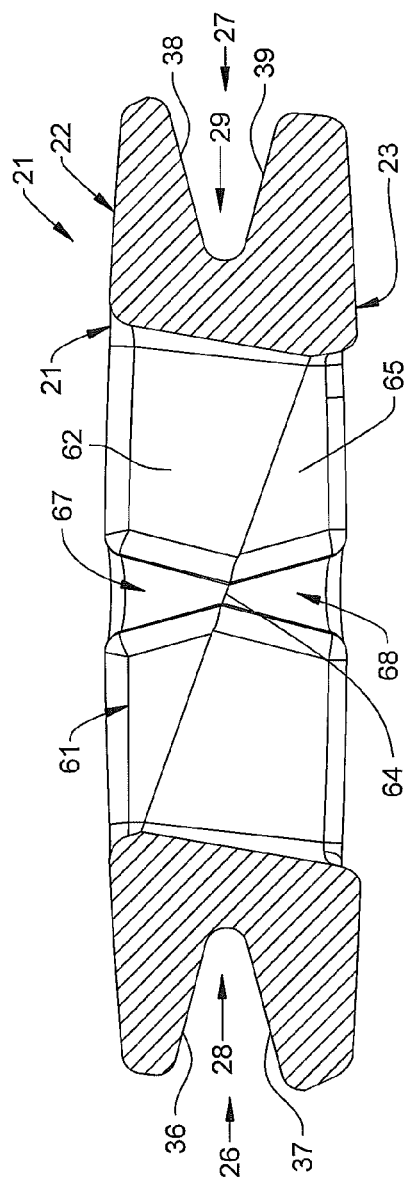
FIG. 9
FIG. 10

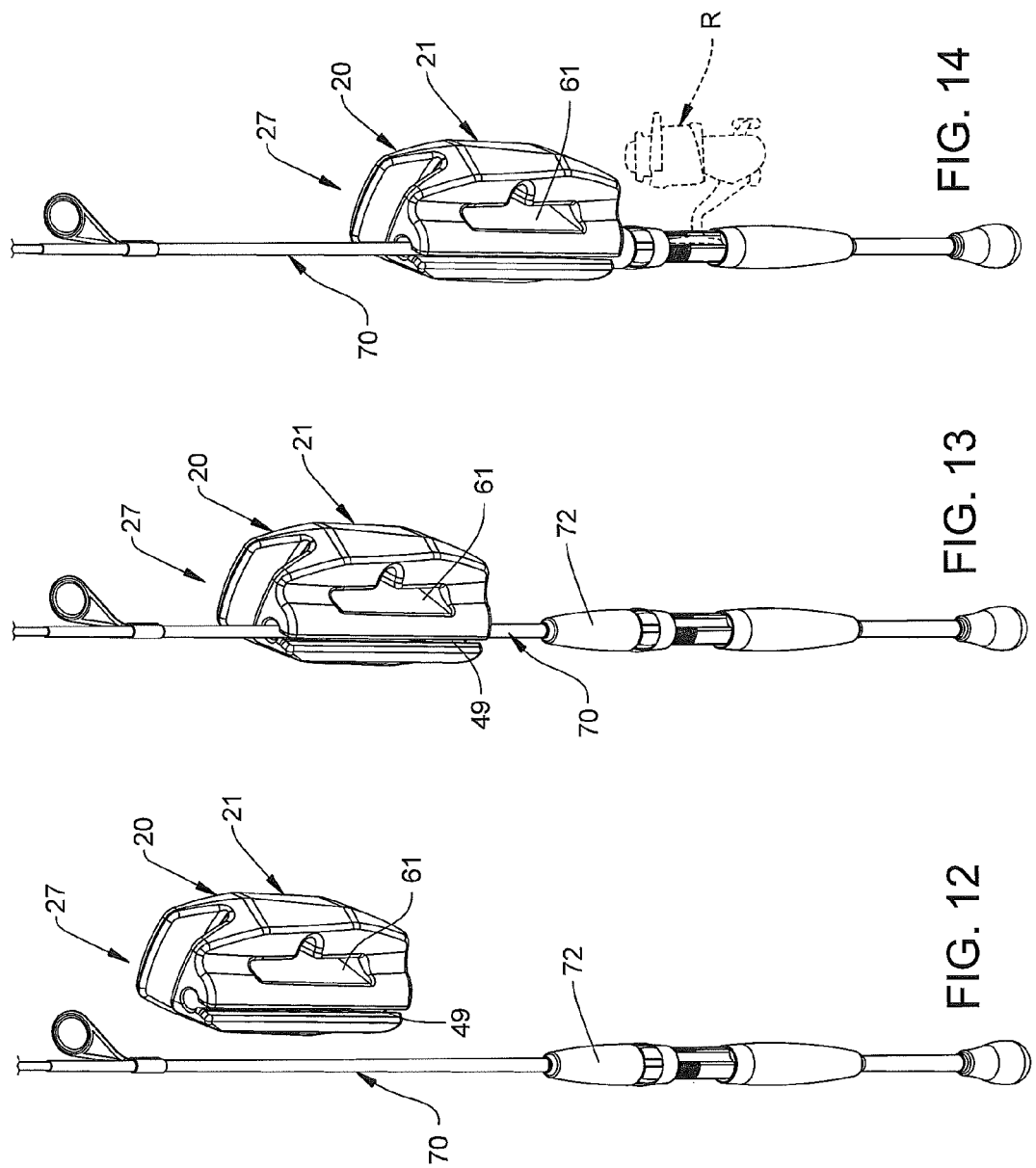

HOLDER FOR RIGGING ATTACHMENT FOR USE ON A FISHING ROD OR POLE

FIELD OF THE INVENTION

This invention relates to a holder for rigging attachment and, more particularly, a holder attachment for pre-assembled rigging for use in fishing, the attachment being configured to be releasably attached to the rod or pole part of a fishing rod.

BACKGROUND OF THE INVENTION

No matter where a fisherman is fishing, or no matter what species of fish the fisherman is targeting, if the fisherman needs a leader, i.e., a section of fishing line longer than a few feet in most instances, and with numerous hooks, referred to a rigging, the fisherman cannot reel the leader through the line guides of the fishing rod and the distal end of the leader is generally so long to prevent the fisherman from just hooking the distal end of the leader onto the rod in some way. As a result, the loose line of the leader gets tangled in other fishing equipment and results in considerable lost time untangling the line from the other fishing equipment.

The teachings in U.S. Pat. No. 2,659,544 do not facilitate allowing the fisherman to store rigging with the fishing rod or pole or facilitate a quick change of rigging for use on the fishing rod or pole.

Accordingly, it is an object of the invention to provide a holder for rigging that is configured to releasably attach to a fishing rod or pole with the holder being configured to store or hold rigging for fishing to enable the fisherman to simply unhook the long leader line from the fishing line at the remote guide on fishing rod and store the leader and rigging on the holder separate from the fishing rod or pole.

It is a further object of the invention to provide a holder as aforesaid wherein pockets and openings are provided on the holder for facilitating the storage of various forms of devices used on the leader section of the line during fishing.

It is a further object of the invention to provide a holder as aforesaid wherein the fisherman can pre-rig a desired mode of fishing and store it on a holder separate from the fishing rod or pole and subsequently attach it to the fishing rod or pole as needed.

It is a further object of the invention to provide a holder as aforesaid wherein a fisherman can quickly reel in a first set of rigging and quickly store it onto a first holder embodying my invention, detach the first holder from the fishing rod and thereafter attach a second holder with a different set of rigging, connect the leader of the different set of rigging to the fishing line and, finally, unwind the new leader with the desired rigging set up and begin fishing with the new rigging set up, all in a minimum amount of time.

SUMMARY OF THE INVENTION

The objects and purposes of the invention are met by providing a holder attachment for holding and storing fishing rigging and features an elongate unitary body made of an elastic material that has the property of generally retaining its shape during use. The elongate body has a longitudinal axis, elongate oppositely facing first and second surfaces, oppositely facing third and fourth surfaces joined to the first and second surfaces at mutually adjacent lateral edges thereof and oppositely facing axial end surfaces. At least the oppositely facing axial end surfaces each having an outwardly opening cavity therein that also opens outwardly at the oppositely facing third and fourth surfaces. At least one of said first and second surfaces has a pair of longitudinally extending ribs protruding outwardly from the at least one of the first and second surfaces so as to define an outwardly opening slot between the ribs that extends coextensively with the longitudinal axis and opening axially outwardly adjacent the oppositely facing end surfaces. The ribs each have a longitudinally extending cavity on opposing surfaces of the ribs to define together an elongate channel. The ribs are configured to be forcibly elastically spread apart to enlarge the lateral width of the slot to facilitate the reception of a fishing rod or pole therebetween and into the channel in each of said ribs. A release of the force spreading the ribs apart enable the elasticity of the material to return to its original shape to thereby hold the fishing rod or pole in the channel.

BRIEF DESCRIPTION OF THE DRAWINGS

Other objects and purposes of the invention will be apparent to persons acquainted with apparatus of this general type upon reading the following specification and inspecting the accompanying drawings, in which:

FIG. 4 is a front view thereof;

FIG. 5 is a rear view thereof;

FIG. 7 is a right end view thereof;

FIG. 8 is a bottom view thereof;

FIG. 9 is a sectional view taken along the line 9-9 of FIG. 3;

FIG. 10 is a sectional view taken along the line 10-10 of FIG. 3;

FIG. 12 is an isometric view of a fishing rod or pole prior to attaching the body to the pole;

FIG. 13 is an isometric view similar to FIG. 12 but with the body attached to the pole; and FIG. 14 is an isometric view similar to FIG. 13 but with the body attached to the pole and slid down onto the fore-grip of the pole.

DETAIL DESCRIPTION

Figure 1:
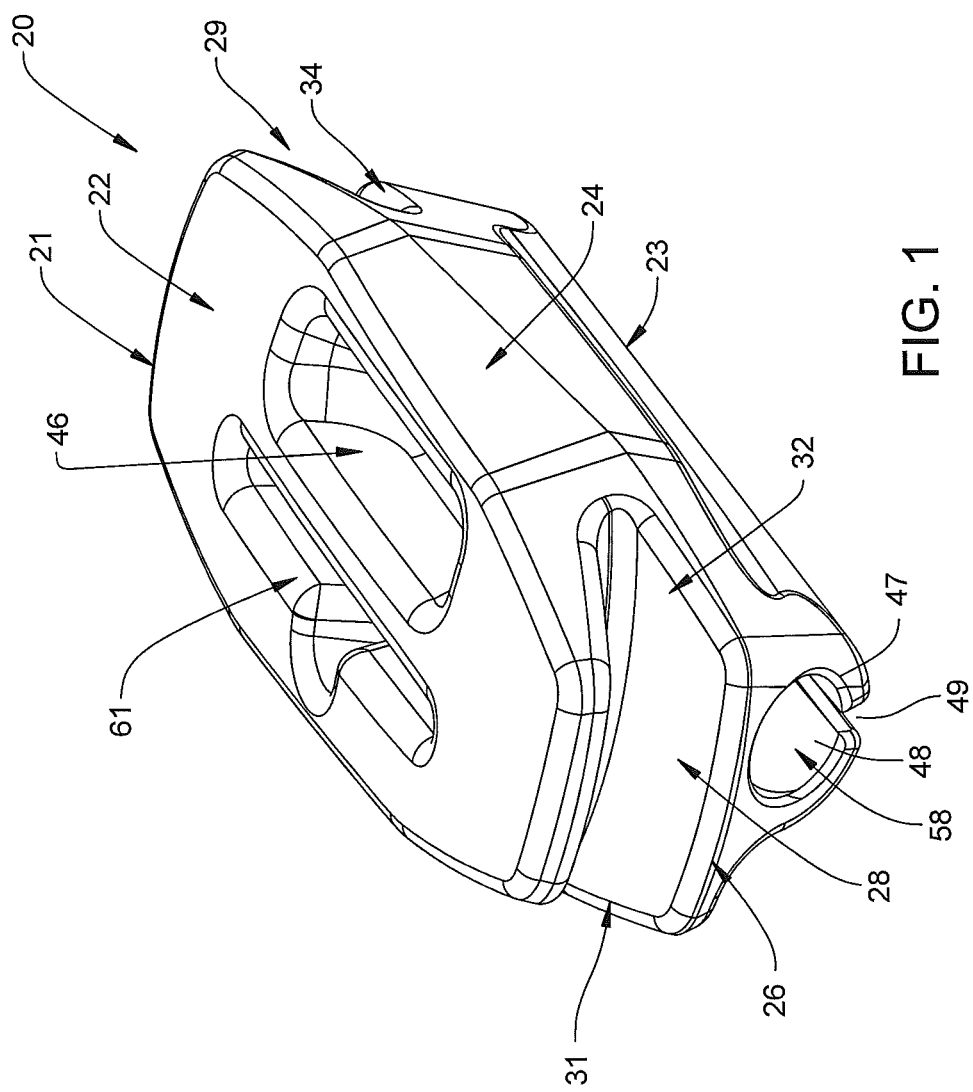
FIG. 1 is a top, front, left end isometric view of a holder attachment embodying my invention.

Certain terminology has been used above and will be used in the following description for convenience in reference only and will not be limiting. The words "up", "down" "right" and "left" will designate directions in the drawings to which reference is made. The words "in" and "out" will refer to directions toward and away from, respectively, the geometric center of the device and designated parts thereof. In addition, the phrases "top surface, "bottom surface", "side surface" and "axial end surface" are used only for convenience is descripting the invention and are not to be limiting. Such terminology will include derivatives and words of similar import.

The figures all illustrate various views described above of a unitary holder attachment 20 embodying my invention. The unitary holder attachment 20 includes an elongate body 21 made of elastic material that has the property of generally retaining its shape during use and has an outer surface with a high coefficient of friction. In this particular embodiment, the elastic material is tough, close-celled flexible foam. This type of foam may be made from materials such as polyvinylchloride, polyurethane, polystyrene, polypropylene, polyethylene, neoprene and mixtures thereof. The foam may be non-reticulated (closed-cell) or reticulated (open-cell), pending upon the softness of the foam and other parameters. In this particular embodiment, the preferred material is a Vinyl-free Olefin based closed-cell, cross-linked elastomer. The Shore A durometer of the preferred material is in the range of 5 to 50 with the preferred range being 15 to 25.

Figure 2:
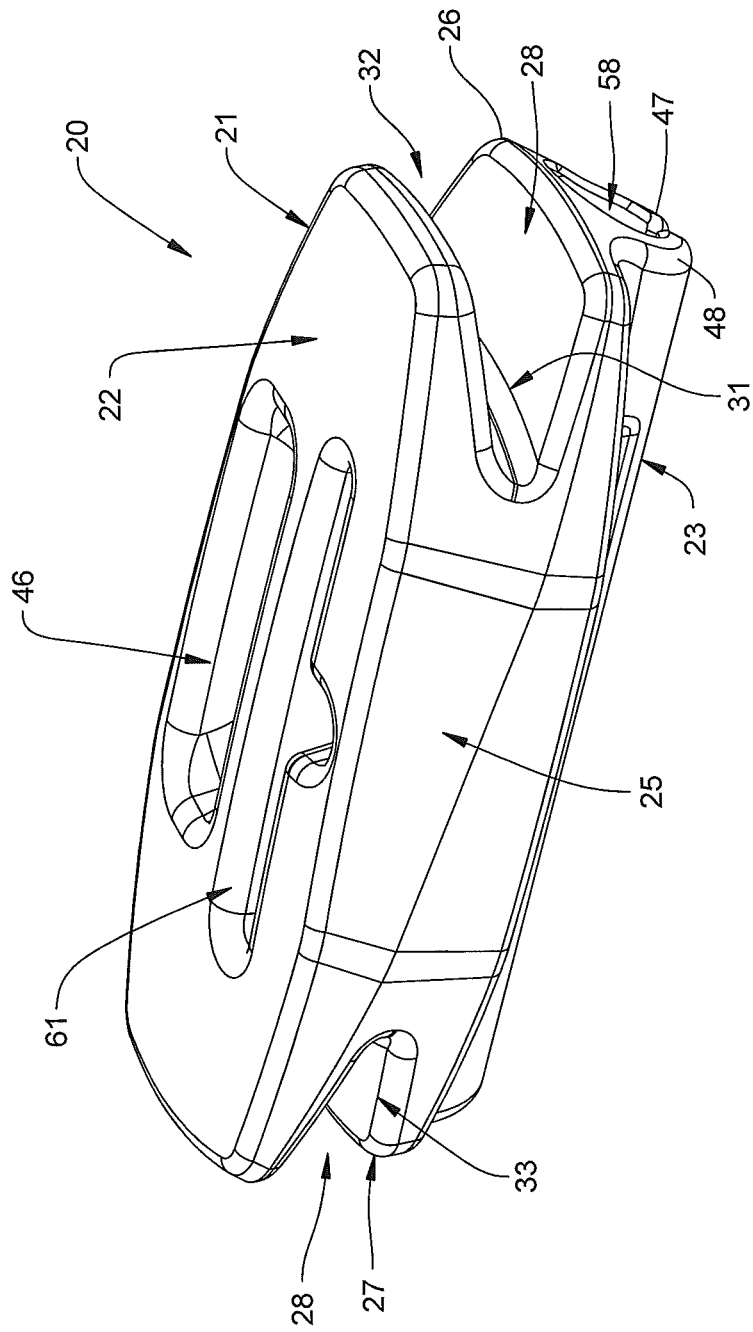
FIG. 2 is a top, rear and left end isometric view of the holder attachment illustrated in FIG. 1.
Figure 3:
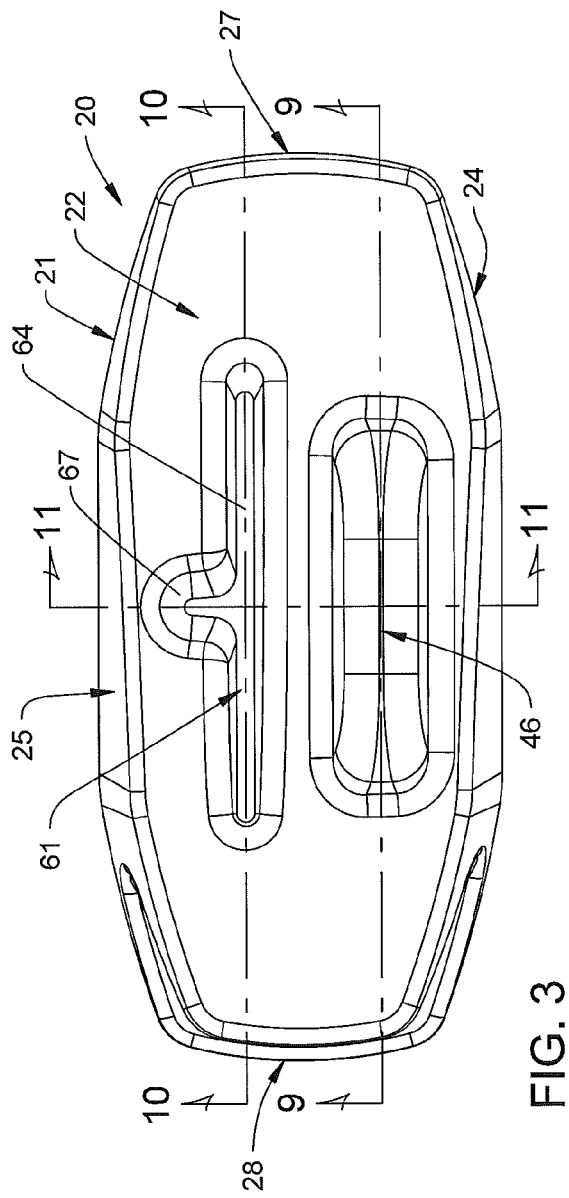
FIG. 3 is a top view of the holder attachment.
Figure 6:
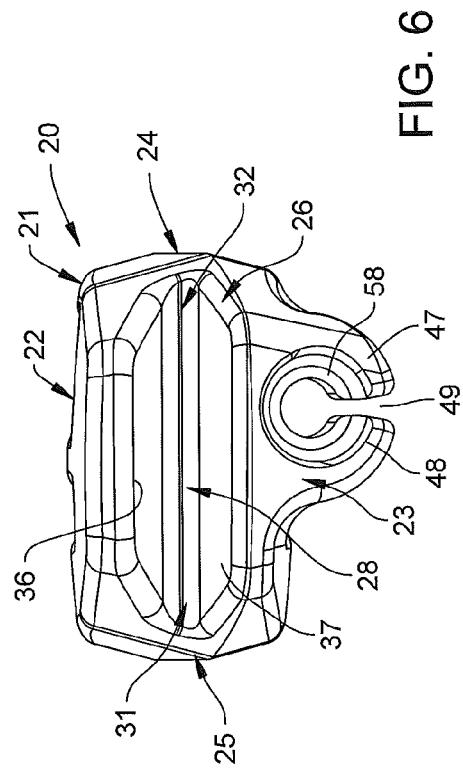
FIG. 6 is a left end view thereof.

The elongate body 21 has a top surface 22, a bottom surface 23, oppositely facing side surfaces 24 and 25 and oppositely facing axial end surfaces 26 and 27. The oppositely facing end surfaces 26 and 27 (FIGS. 1, 2 and 9) each have an axially opening U-shaped or V-shaped cavity 28 and 29, respectively therein that also open laterally outwardly at the side surfaces 24 and 25 as at 31 and 32 for the cavity 28 and at 33 and 34 for the cavity 29. The cavity 28 has an upper wall 36 and a lower wall 37 and, similarly, the cavity 29 has an upper wall 38 and a lower wall 39. A generally horizontal plane P1 (FIG. 9) bisects the spacing between the walls 26, 37 and 38, 39 of the respective cavities 28 and 29. The plane P1 also extends generally parallel to a longitudinal axis 41 of the body.

Figure 11:
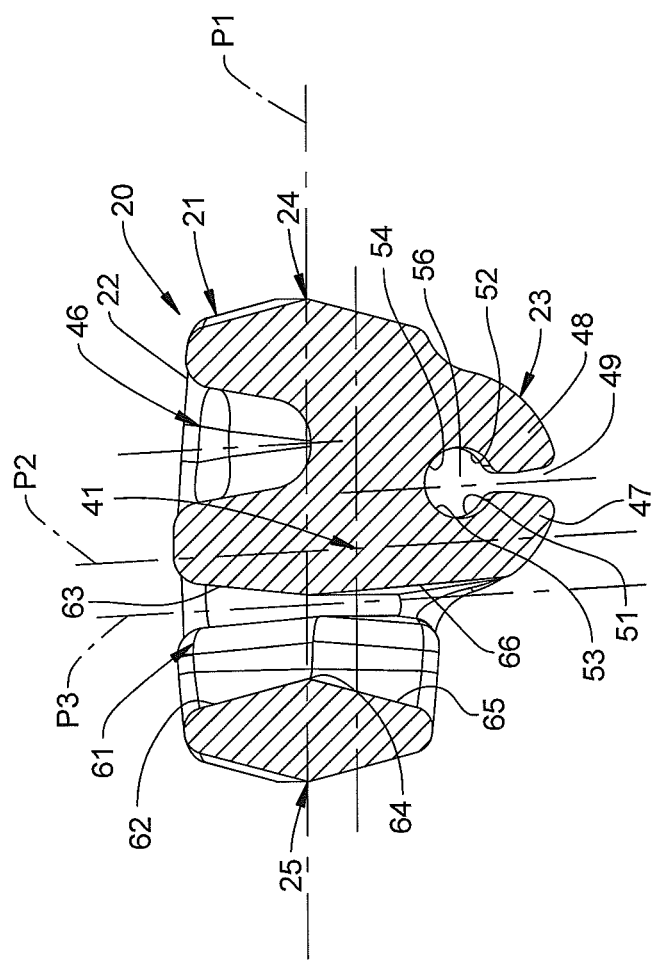
FIG. 11 is a sectional view taken along the line 11-11 of FIG. 3.

A vertically oriented plane P2 extends through the longitudinal axis 41 as shown in FIG. 11 and the plane P2 extends perpendicular to the plane P1 also illustrated in FIG. 9. An elongate pocket 46 of a finite length, width and depth is provided in the top surface 22 of the body 21 and is oriented on one side of the plane P2. Directly below the pocket 46, there is provided a pair of longitudinally extending ribs 47 and 48 extend parallel to the plane P2 and are laterally spaced to define a gap 49 therebetween. Opposing walls 51 and 52 of the 47 and 48 each have a longitudinally extending cavity 53 and 54, respectively, therein that opposes one another so as to define a common channel 56.

In this particular embodiment, the common channel 56 has two segments, namely, a segment 57 having a uniform diameter extending from the axial end surface 27 over a majority of the length of the body 21 and then transitions into an enlarging tapered segment 58 that opens axially outwardly at the axial end surface 26.

The ribs 47 and 48 are each configured to be elastically spread apart to enlarge the gap 49 therebetween to facilitate, when the axial end surface 27 is oriented closest to the distal end of the fishing rod or pole 70, the reception of the fishing rod or pole 70 into the spacing between the ribs and into the channel 56 as shown in FIGS. 12 to 14. A release of the force spreading the ribs apart will enable the elasticity of the material of the body 21 to return the ribs to their original position and shape to thereby hold the fishing rod or pole in the channel 56 and to form a self-gripping system for holding the body 21 on the fishing pole 70.

The top surface 22 of the body 21 has an elongate through opening 61 located on an opposite side of the plane P2 (FIG. 11) from the location of the pocket 46. An axis of the through opening is contained in a plane P3 that is generally parallel to the plane P2. The through opening 61 includes an upper set of opposing wall surfaces 62 and 63 that taper inwardly to a narrow opening 64 at the mid-depth thereof and a lower set of opposing wall surfaces 65 and 66 that taper from the narrow opening 64 outwardly to a larger opening at the bottom surface 23. The opposing internal sidewalls of the through opening 61 are parallel to one another in the lengthwise direction at the top surface 22 as well as at the bottom surface 23.

The inside wall 62 of the through opening 61 has a channel 67 (FIG. 10) therein that tapers from a first diameter at the top surface 22 to a second diameter at the mid-depth location 64 that is smaller than the first diameter. Similarly, the inside wall 65 of the through opening 61 has a channel 68 therein that tapers at the bottom surface 23 from a diameter equal to the aforementioned first diameter to the corresponding second diameter at the mid-depth location 61.

There are many features that allow my invention to perform the tasks of storing any and all rigs on a fishing rod 70 (FIGS. 12 to 14) and ready for immediate use.

[1] The self-gripping system; There are two main components to the self-gripping system. First is the slot or gap 49 and channel segments 57 oriented in the top half of the gripping system and shaped to initially allow the rod blank just above afore-grip 72 on the rod to enter into the straight uniform sized channel segment 57 to a point that the slot or gap 49 closes back over and onto the rod blank because of the molded memory in the material of the body 21 and provides grip to keep the rod blank from escaping back out of the slot 49. This is an important feature of the gripping system. Second feature of the gripping system is the tapered section 58 oriented adjacent the axial end surface 26. The tapered section 58 tapers from the smaller diameter segment 57 to a larger diameter at the axial end surface 26. This allows the body 21 to be, once it has been pushed on over the rod blank just above the fore-grip 72, to be pushed down over the fore-grip 72 as shown in FIG. 14 to facilitate the tapered cavity 58 gripping onto the fore-grip 72 by means of friction from the molded memory of the material. This completes the self-gripping system by facilitating the unitary body 21 both gripping the rod blank above the fore-grip and onto the fore-grip itself. This feature enables my invention to be quickly installed for use or quickly removed.

[2] The control everything T-shaped slot {A} and a Stainless Steel Keeper Pin {B} (not shown); These are two separate components that are both useful by themselves, but also are a system to be used together in combination, in some circumstances, to achieve a result neither can totally achieve by themselves.

{A} The control everything slot or through opening 61; this opening is a T-shaped slot through the unitary body 21 with its long cross of the T being oriented vertically, i.e., extending up and down generally parallel to the length of the fishing rod or pole 70 as it is installed on a fishing rod standing up. The short leg 67 or 68 of the T being oriented horizontally as the body 21 is installed on a fishing rod standing up. This slot or through opening 61 is designed to hold firmly in its grasp all diving sinkers, such as a Dipsey Diver available online or at any retail sporting goods store. The slot is designed to enable a pushing of the diver through the slot a third to a half of the way in from either side with the fin of the diver passing into the single horizontally oriented leg 67 or 68 of the T and the main flat surface of the diver fitting into the long cross bar of the T through opening 61. This slot 61 is also designed for any type of weight, or sinker, or attractor, or many other miscellaneous parts of a fishing rig to be pushed through and then be drawn tight to the back side, then controlling these objects as well. This is where the stainless steel keeper pin comes in to play.

{B} The stainless steel keeper pin (not shown) is a 0.0040 diameter stainless steel wire formed into three circular coils that are one-half inch in diameter stacked tight against each other with a 1½" straight leg [pin] jutting straight off the center of the side of the coils to form a pin 1½" long having a ½" ' circular head to be used by the thumb and forefinger pinching on the head while pushing the wire pin into the body 21 for holding fishing rigging in place in the through opening 61. This pin will serve as a securement mechanism for a swivel, hook, eyelet, etc. that is desired to be held down tight to the body 21 by a remarkable amount of friction between the pin and the material of the body. The pin can be repeatedly penetrated into the material of the body in the same area without damaging the structure of the material, or without lessening the amount of grip the material creates on the pin. A lot of rigs use a sinker or weight and will have a swivel on either or both sides of the object and once pushed through the T slot 61 and drawn up tight to the back side, the pin is then pushed through the eye of the swivel to add insurance that the object does not escape. The keeper pin can also be used to keep very large hooks secured to the unitary body by passing through the eyelet of the hook, or the lowest point of the bend curve of the hook instead of penetrating the unitary body with the larger diameter hook and barb which would be tougher to pull out of the body. The pin will also have a lanyard of high quality Nylon cord attached that can be tied to the unitary body through the T slot. This will not get in the way of using the product in any way, but will make the owner less likely to be upset when the stainless keeper pin is misplaced.

[3] The provision of the vertically aligned cavities 28 and 29 on the axial end surfaces 26 and 27, respectively, when the body 21 is attached to the pole 70 as shown in FIG. 14, facilitate the manual spooling of excess line after a piece of fishing gear on the fishing line strikes the distal line guide on the pole 70 to prevent the reeling in of the excess line onto the reel R schematically shown in FIG. 14.

[4] Once the excess leader has been wound up on the body 21 in the cavities 28 and 29 defining the spool 74 as explained in [3], the body can be removed from the rod by first lifting up on the body to locate the body above the fore-grip 72 on the rod (as illustrated in FIG. 13) and then pulling the body 21 laterally away from the rod to force the rod through the gap to the position illustrated in FIG. 12. Thereafter, a new holder with a different set of fishing rigging thereon pre-assembled by the fisherman can be positioned on the rod in the manner illustrated in FIGS. 12 to 14, the leading end of the leader connected to the fishing line on the pole and the excess line associated with the new rigging set up subsequently unwound from the spool on the new holder so that fishing with the new rigging can commence immediately.

Although a particular preferred embodiment of the invention has been disclosed in detail for illustrative purposes, it will be recognized that variations or modifications of the disclosed apparatus lie within the scope of the present invention.

I claim:

1. A holder for rigging attachment, comprising:
an elongate unitary body made of an elastic material that has the property of generally retaining its shape during use, said elongate body having a longitudinal axis, elongate oppositely facing first and second surfaces, oppositely facing third and fourth surfaces joined to said first and second surfaces at mutually adjacent lateral edges thereof and oppositely facing axial end surfaces, at least said oppositely facing axial end surfaces each having an outwardly opening cavity therein that also opens outwardly at said oppositely facing third and fourth surfaces, at least one of said first and second surfaces having a pair of longitudinally extending ribs protruding outwardly from said at least first and second surfaces so as to define an outwardly opening slot between said ribs that extends coextensively with said longitudinal axis and opening axially outwardly adjacent said oppositely facing end surfaces, said ribs each having a longitudinally extending cavity on surfaces of said ribs that oppose one another that together define an elongate channel, said ribs being configured to be forcibly elastically spread apart to enlarge the lateral width of said slot to facilitate the reception of a fishing rod or pole therebetween and into said channel in each of said ribs, a release of the force spreading said ribs apart enabling the elasticity of said material to return to its original shape to thereby hold said fishing rod or pole in said channel.

2. The holder for rigging attachment according to claim 1, wherein said channel defined by said longitudinally extending cavities in each of said ribs includes a first segment that is of a uniform diameter extending from a mid-length of said body to one of said axial ends and a second segment that is tapered from said uniform diameter mid-length of said channel to an enlarged diameter at an axial end that is opposite said one axial end.

3. The holder for rigging attachment according to claim 1, wherein said first and second surfaces of said body have a common elongate through opening mid-length thereof.

4. The holder for rigging attachment according to claim 3, wherein said through opening is T-shaped.

5. The holder for rigging attachment according to claim 3, wherein one of said first and second surfaces remote from said ribs and said slot defined thereby has a pocket of a finite depth therein located mid-length of said body and side-by-side with said common through opening.

6. The holder for rigging attachment according to claim 1, wherein one of said first and second surfaces remote from said ribs and said slot defined thereby has a pocket of a finite depth therein located mid-length of said body.

7. The holder for rigging attachment according to claim 1, wherein said outwardly opening cavity in each of said axial end surfaces extends laterally of said elongate body and is generally V-shaped or U-shaped in cross section, a bottom segment of each said cavity being oriented in a first plane that intersects said third and fourth surfaces and bisects a spacing between respective side walls of each said cavity.

8. The holder for rigging attachment according to claim 7, wherein said pocket and said ribs defining said slot are located on opposite first and second surfaces of said body and in a second plane that extends generally parallel with said longitudinal axis and generally perpendicular to said first plane.

9. The holder for rigging attachment according to claim 8, wherein a central axis of said through opening extends in a third plane that is generally parallel to said second plane and perpendicular to said first plane.

* * * * *